US012794853B2

(12) United States Patent
Stultz

(10) Patent No.: US 12,794,853 B2
(45) Date of Patent: Nov. 10, 2026

(54) IN-LINE NEURAL NETWORK BASED ZERO-DAY INTERNET EXPLOIT DETECTION

(71) Applicant: Cisco Technology, Inc., San Jose, CA (US)

(72) Inventor: Robert Brandon Stultz, Ellicott City, MD (US)

(73) Assignee: Cisco Technology, Inc., San Jose, CA (US)

( * ) Notice: Subject to any disclaimer, the term of this patent is extended or adjusted under 35 U.S.C. 154(b) by 78 days.

(21) Appl. No.: 18/438,187

(22) Filed: Feb. 9, 2024

(65) Prior Publication Data

US 2025/0247365 A1 Jul. 31, 2025

Related U.S. Application Data

(60) Provisional application No. 63/625,773, filed on Jan. 26, 2024.

(51) Int. Cl.
*H04L 9/40* (2022.01)

(52) U.S. Cl.
CPC ...... *H04L 63/0245* (2013.01); *H04L 63/1416* (2013.01); *H04L 63/1425* (2013.01); *H04L 63/1441* (2013.01)

(58) Field of Classification Search
CPC ............. H04L 63/0245; H04L 63/1416; H04L 63/1425; H04L 63/1441
See application file for complete search history.

(56) References Cited

U.S. PATENT DOCUMENTS

| | | | | |
|---|---|---|---|---|
| 10,771,483 | B2 * | 9/2020 | El-Moussa | H04L 63/1425 |
| 11,232,016 | B1 * | 1/2022 | Huynh | G06N 3/045 |
| 12,218,968 | B1 * | 2/2025 | Harb | H04L 63/145 |
| 2012/0233699 | A1 * | 9/2012 | Jajodia | H04L 63/1433 726/25 |
| 2015/0186645 | A1 * | 7/2015 | Aziz | G06F 9/45558 726/23 |
| 2017/0085588 | A1 * | 3/2017 | Laidlaw | H04L 63/1425 |
| 2018/0219895 | A1 * | 8/2018 | Silver | H04L 43/062 |
| 2018/0288086 | A1 | 10/2018 | Amiri | |
| 2019/0089723 | A1 * | 3/2019 | Valgenti | H04L 63/1416 |
| 2020/0322362 | A1 | 10/2020 | Park | |
| 2022/0109680 | A1 * | 4/2022 | Plaquin | H04L 63/1425 |
| 2022/0201011 | A1 | 6/2022 | Lee | |
| 2022/0335137 | A1 | 10/2022 | Canada | |
| 2023/0205891 | A1 | 6/2023 | Yellapragada | |
| 2023/0231857 | A1 * | 7/2023 | Neupane | G06N 3/0464 726/22 |
| 2024/0089475 | A1 * | 3/2024 | Yu | H04N 19/42 |
| 2024/0127031 | A1 * | 4/2024 | Yous | G06N 3/105 |
| 2024/0244070 | A1 * | 7/2024 | Mohapatra | H04L 63/1425 |

* cited by examiner

*Primary Examiner* — Noura Zoubair
*Assistant Examiner* — Afaq Ali
(74) *Attorney, Agent, or Firm* — Lee & Hayes, P.C.

(57) ABSTRACT

Techniques are described for performing in-line neural network based zero-day exploit detection. A device can scan network content transported across a network. The device can analyze the network content with a neural network machine learning (ML) model that uses a one-dimensional convolution algorithm. The device can analyze the network content to identify exploit related content. The device can drop traffic associated with an exploit identified in the network content.

16 Claims, 7 Drawing Sheets

500

IN-LINE NEURAL NETWORK BASED ZERO-DAY INTERNET EXPLOIT DETECTION

RELATED APPLICATIONS

This application claims benefit of priority to U.S. Provisional Patent Application No. 63/625,773, filed on Jan. 26, 2024, which is incorporated by reference herein in its entirety.

TECHNICAL FIELD

The present disclosure relates generally to using neural network-based machine learning (ML) models to detect and block never-before-seen internet exploits.

BACKGROUND

Security systems may use various strategies to detect and react to exploits that take advantage of vulnerabilities in software or hardware of computing devices. These strategies may include using threat signatures that detect and block exploits. Vendors operating these security systems may continually write and distribute threat signatures to their customers. However, these signatures are typically only written after vulnerabilities are discovered, requiring information on the details of the vulnerabilities for the signatures to be successful. Therefore, security vendors often need to maintain ongoing updates of the security systems with new signatures as new vulnerabilities and exploits are discovered. Exploits may include malicious code or sequences of commands that take advantage of vulnerabilities to subvert intended behaviors in computer systems, allowing an attacker to control the system.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
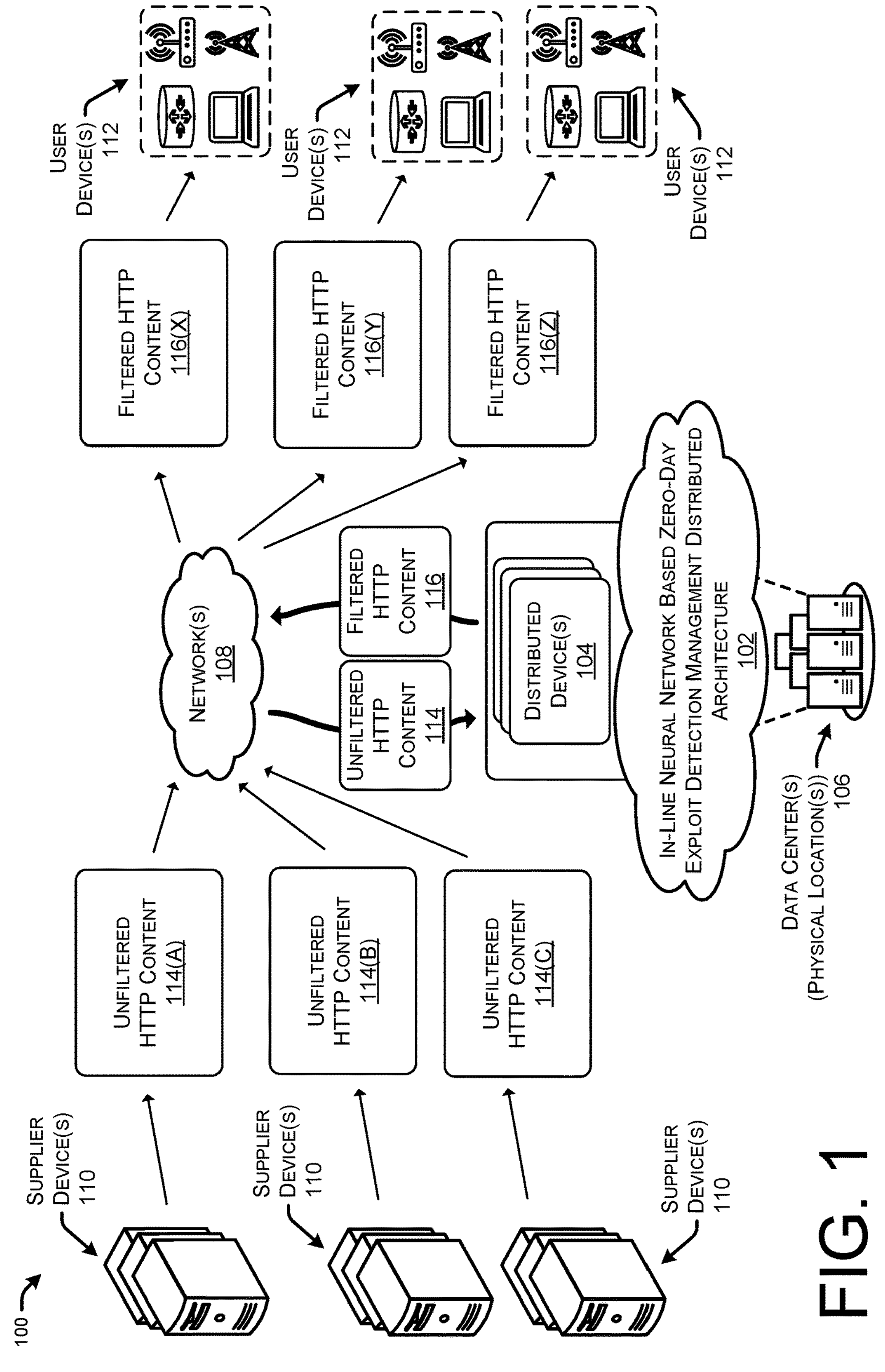
FIG. 1 illustrates an example environment including an in-line neural network based zero-day exploit detection management distributed architecture.

This disclosure describes, in part, techniques for security devices configured to execute neural network algorithms for detecting exploits across networks. The neural networks may be used for detection of never-before-seen exploits at line-rate. Machine learning (ML) models may analyze in-line network traffic and detect exploits based on results of the ML model analysis. The security devices may input the network traffic to the ML models and analyze the network traffic to detect the exploits at line-rate. The exploits may be detected prior to delivery of the network content to destination devices.

This disclosure also describes, in part, security devices configured to distinguish between network content that is benign and network content that is malicious and block the malicious network content. The security devices can perform in-line blocking of the malicious network content at line-rate. The blocking of the malicious network content may be performed based on analysis of the network content by the ML models using neural network algorithms. The analysis of the network content, which may be performed using optimized machine code, may include scanning content associated with application layer protocol sessions (e.g., hypertext transfer protocol (HTTP) sessions). The analysis may include execution of the machine code to identify malicious content. The machine code may be used to identify malicious network content that is associated with exploits, which may include various types of exploits such as command injection attacks, code injection attacks, or SQL injection attacks. The exploits, which may include zero-day exploits, may be blocked without requiring threat signatures.

This disclosure also describes, in part, security devices configured to use ML models that may have convolution layers associated with a spatial neural network algorithm and may be trained using exploit content. The ML models may output prediction values associated with the likelihood that an HTTP session contains an exploit. The convolution layers of the ML models may include first one-dimensional convolution layers and second one-dimensional convolution layers. The ML models may have pooling layers, which may include max pooling layers and global max pooling layers. The ML models may have embedding layers and dense layers. The ML models may process the network content through embedding layers, then the first one-dimensional convolution layers, then the max pooling layers, then the second one-dimensional convolution layers, then the global max pooling layers, and then finally the dense layers.

Additionally, the techniques described herein may be performed by a system and/or device having non-transitory computer-readable media storing computer-executable instructions that, when executed by one or more processors, performs the method described above.

Example Embodiments

Typical data-center architectures include interconnected computer networking devices (e.g., switches, routers, etc.) configured to route immense amounts of traffic to other devices in the architecture. This traffic may include application layer traffic, such as hypertext transfer protocol (HTTP) session traffic, or other communications. For example, these architectures may route traffic for specified HTTP sessions from source devices to destination devices or groups of destination computing devices. In some instances, the HTTP sessions may be used to allow web servers to maintain user identities and/or store user-specific content during multiple request/response interactions between client applications and server applications. The HTTP sessions may be established and used for processing various types of HTTP requests.

In some instances, traffic transported across networks may include attacks that pose serious risks to devices coupled to the network. Security devices may monitor network traffic to protect client and server devices from harm due to malicious content, such as content generated for carrying out the attacks. Security devices may use various strategies to detect malicious content. For example, security devices may scan network traffic for malicious content to identify whether the network traffic includes malicious content. The malicious content may include software, data, and/or commands used to attack vulnerabilities in destination devices.

Security devices may monitor networks to determine if the content transported across the network includes exploit content. For example, an HTTP request on the network may contain an exploit intended to take advantage of a vulnerability in a target system. This exploit may be a never-before-seen exploit leveraging an undisclosed vulnerability. Security devices may identify and block exploits at line-rate. By blocking exploits at line-rate, security devices prevent attacks from reaching target systems.

In some instances, security devices may use machine learning (ML) models that are trained to analyze network content. The ML models may be trained on malicious network content, such as exploit content, and benign network content, such as content used to provide normal network services associated with the Internet. The ML models may be trained to recognize patterns based on the training network content. The training network content may include network traffic that was previously identified as exploit or normal traffic. In contrast to existing ML models that may be trained on non-exploit related content such as vulnerable code, the ML models according to the techniques discussed herein may be trained directly on exploit network content.

Training network traffic may include normal traffic associated with various systems and/or services and corresponding exploit traffic fitting a vulnerability type. In contrast to existing ML models that may be trained based on training network content that is associated with specific targets and/or previously known targets, the ML models according to the techniques discussed herein may be trained on entire vulnerability classes that may be present in any target. The ML models according to the techniques discussed herein may be trained to identify new exploits fitting these vulnerability classes. For example, the vulnerability classes may be associated with targets of unspecified types and/or previously unknown targets. In contrast to existing ML models that may be trained based on training content that is associated with targets that include specific and/or designated applications, and/or specific and/or designated programs, the ML models according to the techniques herein may be trained to identify never-before-seen exploits associated with targets that include unknown applications and/or unknown programs.

In some instances, ML models used by security devices may utilize spatial analysis to analyze and block exploits, including never-before-seen exploits. The spatial analysis may be performed using spatial neural network algorithms and may include one-dimensional convolutional analysis of network content. The one-dimensional convolutional analysis performed by the ML models may enable the ML models to identify and detect exploits more quickly and accurately than ML models according to conventional technology. In contrast to existing ML models that may use algorithms such as support vector machine (SVM), k-nearest neighbor, or naive bayes algorithms, the ML models according to the techniques discussed herein may use spatial convolution algorithms and advanced vector extension machine code instructions to efficiently analyze large amounts of network content. Efficient and effective analysis of network traffic may enable the security devices to detect the exploits notwithstanding the exploits being never-before-seen exploits that are transported among the large amounts of network content.

In some instances, the ML models may analyze network content by compiling the model instructions down to optimized machine code. The model may then use this optimized machine code to process network content quickly enough for in-line operation. The ML models do not require signatures and/or rules to analyze the network content. In contrast to existing security devices that use signatures, such as threat signatures, and/or signature strategies, such as deep packet inspection signature-based strategies, to identify known exploits, the ML models according to the techniques discussed herein perform in-line detection and blocking of exploits without using signatures. In contrast to existing security devices that use firewall rules to perform exploit classification and/or to identify known exploits, the ML models according to the techniques discussed herein perform, in-line, detection and blocking of exploits without using rules.

In some instances, the ML models may perform character level analysis using optimized machine code. By utilizing character level analysis, the ML models may identify a wider range of exploits than conventional word-based ML models. Since the ML models use optimized machine code, they may be operated by edge devices, requiring less computational resources compared to conventional cloud-based ML models. In contrast to existing security devices that may perform relatively slow word level analysis by consulting look-up tables generated ahead of time, the ML models according to the techniques herein can perform relatively rapid analysis of the network content at the character level and at line-rate.

In contrast to existing security devices that use signature-based approaches to identify known exploits, the ML models according to the techniques discussed herein can be trained on entire classes of exploits and therefore may be capable of detecting never-before-seen exploits targeting unspecified web applications and/or applications that were unknown at the time the ML models were trained.

In some instances, the ML models may be used to perform convolutional analysis of network content. The ML models may use neural networks to visualize exploit patterns in the network content. The neural network architectures of the ML models may be used to detect various types of exploits, including exploits employing command injection, code injection, SQL injection, and so on, or any combination thereof. In contrast to existing security devices that utilize ML models trained to detect non-exploit oriented malicious content, such as malware-oriented file-based features, the ML models, according to the techniques discussed herein, can detect network-based attacks.

In some instances, security devices may be used to identify and detect exploits based on scanned network traffic. The network traffic can be scanned at line-rate by the ML models, which may be updated dynamically as new ML models with relatively more efficient and effective algorithms are identified. Training network content used to train the ML models may be updated based on accuracy and loss metrics associated with performance of the ML models. In contrast to existing security devices that may utilize signatures such as deep packet inspection signatures written to detect previously identified malicious content, the security devices according to the techniques discussed herein target new never-before-seen exploits. Moreover, the security devices described herein can use neural network-based ML models and do not require signature generation to perform exploit detection.

To provide an example, envision a data center architecture containing security devices which monitor network traffic across various networks. The networks may be used to manage services associated with the Internet. Exploit traffic fitting known vulnerability types and associated normal traffic can be used to train an ML model. The ML model then can be loaded onto the security devices which monitor network traffic. These security devices can now process network traffic with the ML model to scan it for potential exploits. If an exploit is found, the security devices can block it thereby preventing the exploit from reaching the target system.

Network exploits may include command injection, code injection, or SQL injection attacks. Command injection attacks may alter the normal behavior of applications to execute attacker-controlled system commands. Code injection attacks may introduce attacker controlled malicious code into vulnerable applications. Finally, SQL injection attacks may insert malicious SQL statements into normal database instructions.

Thereafter, the security devices can scan network traffic for application layer protocol data, which may include HTTP session related data. The security devices can input the network data into a neural network-based ML model. Security devices according to the techniques discussed herein can use neural network-based ML models to detect exploits at line-rate. In contrast to existing security devices that may use off-site or cloud-based ML models that may be unable to effectively detect exploits quickly enough to block the exploits prior to execution of the exploit, the security devices according to the techniques discussed herein that detect exploits at line-rate can effectively block the exploits prior to delivery of the exploits to the destination devices. The security devices can utilize the ML models to block the never-before-seen exploits, such as attacks allowing attacker devices to control target systems and/or denial-of-service (DoS) attacks.

Generally, the techniques of this application improve the technical capabilities and the ease of use of security devices. Unlike conventional signature-based approaches, the ML model doesn't have to be updated every time there is a new vulnerability. The ML model also reduces the number of signatures required to protect applications by augmenting conventional signature-based security devices with ML models capable of detecting never-before-seen exploits fitting known vulnerability types. Operational efficiency of security devices is enhanced by ML model analysis according to the techniques discussed herein, which thereby optimizes consumption of compute resources of security devices.

While techniques according to conventional technology exist such as the threat signature creation for preventing undesirable breaches following detection of the exploits, such techniques rely on security policies utilized to generate the threat signatures for performing ongoing comparisons with subsequent communications, such as HTTP requests. A need exists for detecting and preventing zero-day and never-before-seen exploits prior to delivery of communications associated with the exploits to the destination devices. The techniques described herein address such a need by, in part, ensuring that communications associated with the zero day and never-before-seen exploits may be blocked from delivery to the destination devices. In contrast to existing security devices that must wait until previous exploits have been identified to define threat signatures for subsequent detection of the exploits, the security devices according to the techniques discussed herein may preemptively detect and block the exploits. Preemptive detection and blocking of the exploits conserves device and/or system resources that may otherwise be expended according to conventional signature-based techniques.

By utilizing the techniques of this application to improve the performance of various types of networks by expeditiously and safely blocking exploits in-line, resources that would otherwise be required to repair unsafe data breaches of significant sizes may be conserved and reallocated to other purposes. In contrast to existing security devices that require large numbers of threat signatures based on previous exploits, the security devices according to the techniques discussed herein may avoid heavy consumption of resources by blocking the exploits with a single ML model. Blocking the exploits in-line may be performed to minimize or prevent data loss, data corruption, security breaches, and/or loss of control of the destination devices.

While a single security device and a single network may be utilized to perform exploit detection, any number of security devices, individually or in combination, and any number of networks, individually or in combination, may be utilized in a similar way as for the security device and the network, respectively, for purposes of implementing any of the techniques as discussed herein. While a single ML model may be utilized for exploit detection, any number of various types of ML models, individually or in combination, may be utilized in a similar way as for the ML model, respectively, for purposes of implementing any of the techniques as discussed herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 including an in-line neural network based zero-day exploit detection management distributed architecture 102. In various implementations, the in-line neural network based zero-day exploit detection management distributed architecture 102 can include one or more distributed devices 104.

Generally, the in-line neural network based zero-day exploit detection management distributed architecture 102 may include devices housed or located in one or more data centers 106 that may be located at different physical locations. For instance, the in-line neural network based zero-day exploit detection management distributed architecture 102 may be supported by networks of devices in a public cloud computing platform, a private/enterprise computing platform, and/or any combination thereof. The one or more data centers may be physical facilities or buildings located across geographic areas. The geographic areas may be designated to store networked devices that are part of the in-line neural network based zero-day exploit detection management distributed architecture 102. The data centers 106 may include individual ones of the distributed device(s) 104, which may also be included in one or more other data centers. The data centers 106 may include various networking devices, as well as redundant or backup components and infrastructure for power supply, data communications connections, environmental controls, and various security devices. In some examples, the data centers 106 may include one or more virtual data centers which are a pool or collection of cloud infrastructure resources specifically designed for enterprise needs, and/or for cloud-based service provider needs. Generally, the data centers 106 (physical and/or virtual) may provide basic resources such as processor (CPU), memory (RAM), storage (disk), and networking (bandwidth). However, in some examples the devices in the in-line neural network based zero-day exploit detection management distributed architecture 102 may not be located in explicitly defined data centers 106, but may be located in other locations or buildings.

The in-line neural network based zero-day exploit detection management distributed architecture 102 can manage content associated with client devices (e.g., the supplier device(s) 110 and/or the user device(s) 112, as discussed below) over one or more networks 108, such as the Internet. In various examples, the management includes one or more of various devices and/or systems using and/or accessing the in-line neural network based zero-day exploit detection management distributed architecture 102 to manage content. The in-line neural network based zero-day exploit detection management distributed architecture 102, and the networks 108, may each respectively include one or more networks implemented by any viable communication technology, such as wired and/or wireless modalities and/or technologies. The in-line neural network based zero-day exploit detection management distributed architecture 102 and networks 108 may each include any combination of local area networks (LANs), metropolitan area networks (MANs), wide area networks (WANs), and/or the Internet—both centralized and/or distributed—and/or any combination, permutation, and/or aggregation thereof. The in-line neural network based zero-day exploit detection management distributed architecture 102 may include devices, virtual resources, or other nodes that relay packets from one network segment to another by nodes in the computer network.

In various cases, in-line detection of exploits (or "attacks") can include collecting edge points (e.g., edge points at edge devices) and finding all lines on which the edge points lie. The exploits can include hypertext transfer protocol (HTTP) requests associated with exploits, which can be detected between a source (e.g., a supplier device 110) and a destination (e.g., a user device 112), at line-rate.

In various examples, the distributed device(s) 104 can include one or more edge devices. For example, the distributed device(s) 104 can be positioned at an edge, which may include one or more endpoints of the network(s) 108. The distributed device(s) 104 can be positioned at the endpoint(s), to which one or more network nodes in a core of the network(s) 108 provide one or more network services. The distributed device(s) 104, which may be positioned in the edge directly outside the network core, may be positioned at a location in the network(s) where one or more computing device(s) (e.g., the supplier device(s) 110, the user device(s) 112, etc.) interface with the Internet.

In some examples, the distributed device(s) 104 can analyze network traffic and detect one or more exploits in the network traffic. The environment 100 may include one or more supplier devices 110 and one or more user devices 112. The network traffic may include network content transmitted by the supplier device(s) 110 to the user device(s) 112. The network traffic may include network content transported across a network 108. The distributed device(s) 104 can scour the network(s) 108 and scan the network traffic exchanged on the network(s) 108. The distributed device(s) 104 can filter out malicious content associated with the exploit(s).

In some examples, the network content may include one or more portions of unfiltered HTTP content (also referred to herein simply as "unfiltered HTTP content") 114(A), 114(B), 114(C), etc., (also referred to herein collectively as "114"). In those or other examples, the network content may include one or more portions of filtered HTTP content (also referred to herein simply as "filtered HTTP content") 116(X), 116(Y), 116(Z), etc., (also referred to herein collectively as "116"). For instance, the filtered HTTP content 116 can be communicated and/or routed based on the distributed device(s) 104 filtering out of the unfiltered HTTP content 114, the malicious content related to the exploit(s), to produce the filtered HTTP content 116. In such an instance or another instance, the unfiltered HTTP content 114 can be transformed into the filtered HTTP content 116 based on the unfiltered HTTP content 114 being stripped of the malicious content related to the exploit(s).

Although the network content includes the HTTP content (e.g., the unfiltered HTTP content and/or the filtered HTTP content 116, as discussed below in the current disclosure), it is not limited as such. In various examples, the network content includes any of the HTTP content, which can include one or more HTTP requests, one or more HTTP request query strings, any other type of HTTP content, any other type of network and/or Internet content, or any combination thereof.

In various examples, the distributed device(s) 104 may include one or more machine learning (ML) models. The ML model(s), for instance, may be, and/or may include one or more neural network-based ML models. The neural network-based ML model(s) may analyze network content using one or more spatial algorithms. The spatial algorithm(s) may include one or more convolutional algorithms.

The ML model(s) can use one or more neural networks to analyze network content in-line. The ML model(s) can scan network content to detect the exploit(s) in unfiltered HTTP content 114. The ML model(s) can scan network content and detect exploit(s) at line-rate. For example, the ML model(s) can use spatial algorithms to analyze the unfiltered HTTP content 114 and detect the exploit(s) prior to delivery to the user device(s) 112. The ML model(s) may detect and block the exploit(s) in-line.

The distributed device(s) 104 can use the ML model(s) to detect various kinds of exploits. For example, the ML model(s) can analyze the network content to detect the exploit(s), which can include one or more command injection attacks, one or more code injection attacks, one or more SQL injection attacks, and so on, or any combination thereof. The ML model(s) can detect the exploits, such as one or more command injection-based exploits, one or more code injection-based exploits, one or more SQL injection-based exploits, and/or various other exploits, any of which may include a zero-day never-before seen exploit. The distributed device(s) 104 can block the detected exploit(s) or attack(s) in-line.

The distributed device(s) 104 can control the network traffic by blocking the exploit(s) detected by the ML model(s). Blocking the exploit(s) can include the distributed device(s) 104 intercepting and/or extracting one or more portions of application layer content associated with the exploit(s) in the network traffic. By blocking the exploit(s), the distributed device(s) 104 can prevent the exploit related content from reaching the user device(s) 112. Blocking the exploit related content from one or more destinations, such as the user device(s) 112, can enable the distributed device(s) 104 to protect the user device(s) 112 from harm due to execution of the exploit(s). The distributed device(s) 104 can block the exploits during one or more transmissions of the exploit(s) and prior to execution of the exploit(s).

The ML model(s) can use character level analysis to detect the exploit(s), which may be blocked by compiling instructions associated with the ML model(s) down to machine code and executing the instructions at a machine code level. Compilation may include just-in-time compilation of the ML model instructions down to optimized machine code. Character level analysis can be performed by analyzing each byte of the network content to identify exploit(s). By compiling ML model instructions down to optimized machine code, the distributed device(s) 104 can perform analysis and detection of exploits at line-rate (e.g., in microseconds).

The ML model(s) employed by the distribution device(s) 104 can be trained through a process called stochastic gradient descent. Attack traffic is collected, labeled, and grouped by vulnerability type. Similar benign traffic is also collected and labeled. This labeled past exploit and/or normal traffic can then be used to train the ML model(s). In various cases, normal traffic can include any traffic aside from attack traffic. For example, normal traffic can include benign traffic, and/or any other types of traffic that is not malicious. By training the ML model(s) on past exploit and/or normal traffic, the ML model(s) can identify future exploit(s) fitting the trained vulnerability type(s).

Attack traffic may be continuously collected, labeled, and grouped by vulnerability type for further ML model training. Relevant normal traffic may also be continuously collected and labeled. The training process can use correctly labeled traffic content, which can include malicious and/or normal traffic content, to adjust the filters, weights, and biases, as discussed below in further detail, of the neural network so that it can make accurate predictions on future traffic, including never-before-seen attack traffic.

In various examples, one or more types of information may be used to correctly assign label(s) to network content. For instance, one or more payloads within the network content may be known attack traffic and therefore labeled as malicious. Pattern(s) in unknown network traffic can then be classified by the ML model(s) based on the training traffic and label(s).

The training process can adjust several characteristics inherent to the ML model so that it can make accurate predictions on future traffic. These characteristics can include one or more convolution filters, one or more neuron connection weights, and/or one or more neuron connection biases. The distributed device(s) 104 can store filter(s), weight(s), and bias(es) in the model structure. The distributed device(s) 104 can load the filter(s), weight(s), and bias(es) into a network inspector (e.g., a program executed by the distribution device(s) 104) for traffic processing.

In some instances, the filter(s), weight(s), and bias(es) of various types can be loaded. The filter(s) can include small matrices of weights that slide over input data (e.g., the traffic being analyzed), perform element-wise multiplication with parts of the input they are currently on, and then sum up all results into a single output value. The weight(s) can be used to control signals (or strengths of connections) between two neurons. The weight(s) can be used to decide how much influence input to the ML model(s) will have on output of the ML model(s). The bias(es) can include additional input into next layers that does not depend on any input value.

Once the ML model(s) are trained on the training data, they can identify one or more patterns or features associated with past exploit content. The ML model(s) can generate a probability that input traffic is malicious based on these prior patterns learned during the training process. For instance, a probability identifier corresponding to the probability (or "output probability") can be generated by the ML model(s) and used for any type of analysis performed by the ML model(s). During traffic processing, a network inspector can compare this output probability with a threshold (or "probability threshold"). If the output probability is found to be higher than the probability threshold the network inspector can issue an alert and/or block the potentially malicious traffic.

The distributed device(s) 104 can use the ML model(s) to prevent unsafe content from reaching destination user device(s) 112. For example, the distributed device(s) 104 can use the ML model(s) to prevent exploit related content from reaching destination user device(s) 112.

In various examples, the ML model(s) can be trained and/or retrained on an ongoing basis. Ongoing training can improve the accuracy and precision of the ML model(s) over time. The ML model(s) can be dynamically updated to increase performance and/or accuracy, and/or to detect different kinds of exploits.

In some cases, the filter(s), weight(s), and bias(es), associated with the ML model(s) can be altered. For instance, any of the characteristic(s) of the ML model(s) can be modified in real-time. The characteristic(s) of the ML model(s) can be modified based on new training data, on an ongoing basis. One or more updates of the ML model(s) can be released to the distributed device(s) 104.

In some cases, the ML model(s) can be dynamically modified and/or updated in real-time to include new and/or different types of ML model(s) and/or to be replaced by the new and/or the different types of ML model(s). Any of the ML model(s) can be modified and/or updated to include individual new and/or different types of ML model(s). By dynamically updating the ML model(s), any of the neural network(s) can be updated with new and/or different neural networks, and/or any of the neural network(s) can be replaced by new and/or different types of exploit detection-oriented ML model algorithms.

Although the ML model(s) can be managed, controlled, updated, etc., in various ways, as discussed above in the current disclosure, it is not limited as such. In various examples, the distributed device(s) 104 can perform, by one or more computing devices, any of one or more types of management of the ML model(s), such as one or more user devices, one or more operator devices, and so on, or any combination thereof. The computing device(s) used to manage, control, update, etc., the ML model(s) can include any of one or more types of devices (e.g., the distributed device(s) 104, one or more other devices within the data center(s) 106 and/or the in-line neural network based zero-day exploit detection management distributed architecture 102, one or more remote and/or external devices, etc., or any combination thereof).

As a hypothetical example, a device (e.g., one of the distributed device(s) 104) can scan, with an inspector, Internet traffic for HTTP requests and detect if a request is associated with an exploit. The inspector can include software code and/or program instructions used to analyze the HTTP request and identify if the HTTP request is malicious. The inspector can use a neural network ML model that is loaded from a model file specified in a configuration (or "inspector configuration").

In the hypothetical example, a network inspector can load the ML model, instantiate a binary classifier based on the model, and scan network content with the binary classifier. The binary classifier can return a probability that the HTTP request is associated with an exploit. If this probability is above a threshold the inspector can issue an alert and/or drop the traffic associated with the exploit. Likewise, if this probability is below the threshold, then the inspector can allow the normal traffic through to the destination. The binary classifier probability can be thought of as a prediction value associated with the likelihood that an application layer protocol message (e.g., HTTP request) is associated with an exploit.

In the hypothetical example, the process of training the ML model can include labelling network traffic, such as labeling traffic not associated with exploits as benign, and traffic associated with exploits as malicious. For example, HTTP uniform resource identifier (URI) parameters and HTTP POST parameters can be collected and labeled. The content used to train the ML model can be collected from previous exploit related content, normal packet capture (or "PCAP") files (e.g., files that contain network packet data that are used to analyze network characteristics), normal web crawl PCAP files based on page view rank, common crawl content, or any other type of web-based and/or Internet content, or any combination thereof.

In the hypothetical example, query string traffic can be labeled and then split up into training content and validation content. An application program interface (API) designed for ML model analysis can be used to build a sequential neural network including one or more layers (e.g., the layer(s) as discussed below with reference to FIGS. 2 and 3).

In the hypothetical example, the ML model using the spatial-based neural network algorithm can be generated and trained on the labeled network content using stochastic gradient descent. The ML model can be optimized using neural network optimization methods such as integer quantization. The ML model can be tested against labeled validation content (e.g., the validation content created from the query string traffic). The ML model can be trained based on labeled attack traffic (e.g., traffic associated with exploits) and benign traffic. Additional testing can be performed based on network content including never-before-seen exploits.

In the hypothetical example, stochastic gradient descent training can include calculating the gradient of the neural network's loss function and then using that gradient to iteratively optimize the filter(s), weight(s), and bias(es) of the neural network to minimize the network's loss and maximize its accuracy.

In the hypothetical example, the ML model can be converted by a model conversion process to a FlatBuffers file. The device can load the FlatBuffers file into the inspector. Once the inspector loads the ML model and instantiates the interpreter, the device can use the ML model for ongoing analysis of network content and in-line detection of exploits.

In the hypothetical example, the device can use output of the ML model in various ways. If the ML model identifies traffic as malicious then the inspector can generate alerts and/or block the traffic from reaching its destination. The device can transmit one or more communications to a supplier device 110 to identify the exploit related content as flagged and/or blocked, to identify any other types of information, or any combination thereof.

In the hypothetical example, the device can use output of the ML model in various additional ways. The device can transmit, to a user device 112, one or more communications. The communication(s) can include information indicating that content being communicated to the user device 112 has been blocked, information indicating that the communicated content is exploit related content, information indicating that a probability of the communicated content being exploit related content is higher than a threshold probability, information indicating that subsequent communications associated with the supplier device 110 have been blocked, information indicating that the user device 112 may obtain additional information regarding the content in the corresponding communication, one or more other types of information, or any combination thereof.

Although the communications may be transmitted to the supplier device 110 and/or the user device 112, as discussed above in the current disclosure, it is not limited as such. In some examples, the device can determine not to send, and/or refrain from sending, any of the communication(s) for various reasons, such as to maintain security and/or privacy of the user device 112. The device can determine not to send, and/or refrain from sending, the communication(s) to enable the supplier device 110 to be analyzed for possible future communication(s). The device can determine not to send, and/or refrain from sending, the communication(s) to determine whether the supplier device 110 exhibits a pattern of ongoing malicious transmissions. The device can track information based on the future transmissions of the supplier device 110. The device can use information based on the future transmissions of the supplier device 110 for training of the ML model, for example.

In the hypothetical example, any portions of the process may be implemented by various computing devices. For example, any portions of the process may be implemented by one or more types of devices (e.g., the distributed device(s) 104, one or more other devices within the data center(s) 106 and/or the in-line neural network based zero-day exploit detection management distributed architecture 102, one or more remote and/or external devices, etc., or any combination thereof).

Although various terms, including "device(s)" and/or "system(s)," are used for purposes of simplicity, clarity, and/or ease of explanation throughout the current disclosure, it is not limited as such. In various examples, the terms "device(s)" and/or "system(s)" can be interpreted as being interchangeable, as appropriate, for purposes of implementing any of the techniques as discussed herein. For instance, any functions of the techniques discussed herein being performed by device(s) and/or system(s) can be performed by of any number devices and/or of any number systems.

Figure 2:
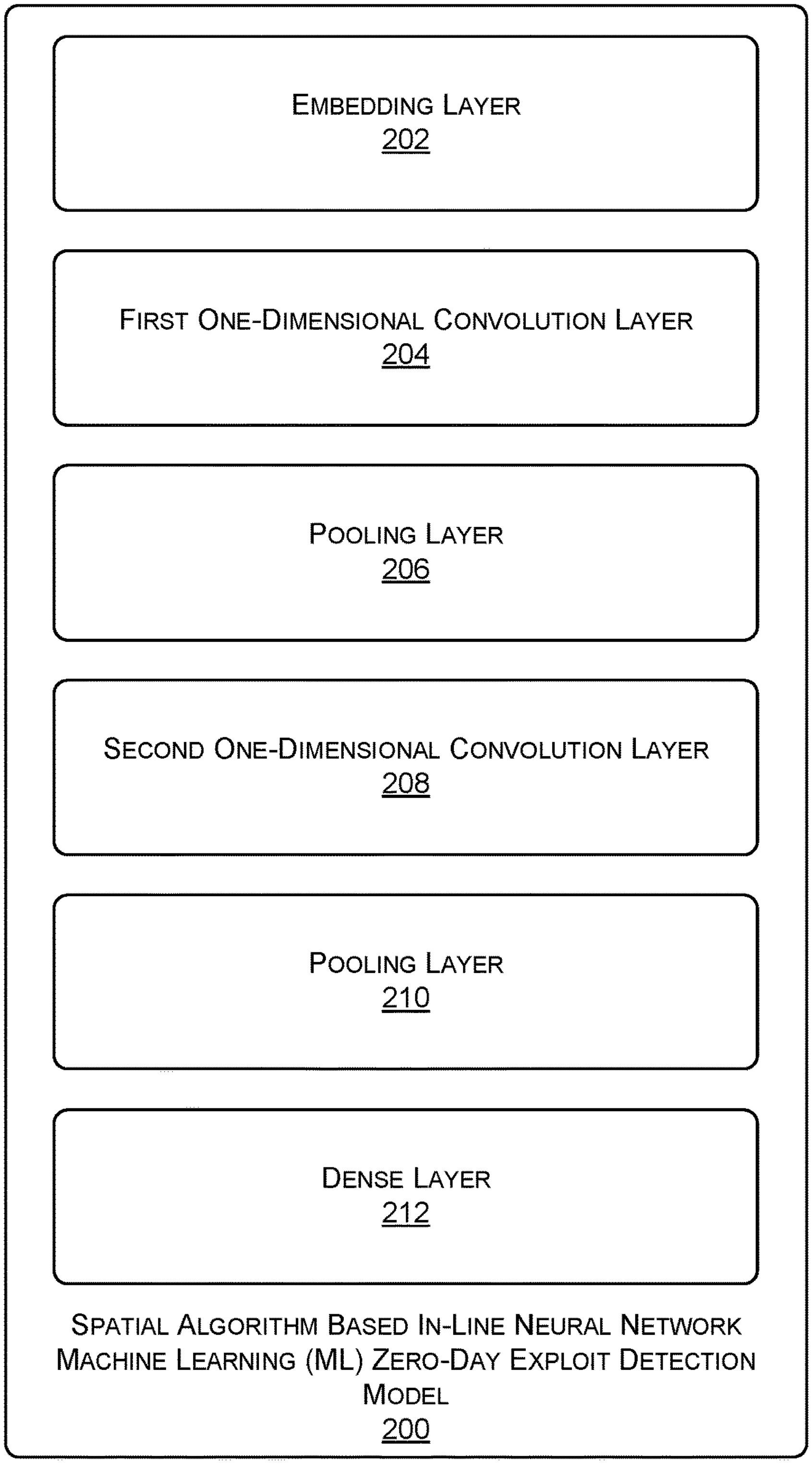
FIG. 2 illustrates a block diagram of an example in-line neural network-based machine learning (ML) zero-day exploit detection model 200.

FIG. 2 illustrates a block diagram of an example spatial algorithm-based in-line neural network machine learning (ML) zero-day exploit detection model 200. The spatial algorithm-based in-line neural network machine learning (ML) zero-day exploit detection model (also referred to herein simply as "ML model") 200 includes one or more layers for analysis of network content (e.g., the unfiltered hypertext transfer protocol (HTTP) content 114 as discussed above with reference to FIG. 1). In various examples, the ML model 200 can be used to implement any of the ML model(s), as discussed above with reference to FIG. 1. The ML model 200 can be managed by one or more devices (e.g., the distributed device(s) 104, as discussed above with reference to FIG. 1).

In some examples, the layer(s) of the ML model 200 can include an embedding layer 202, a first one-dimensional convolution layer 204, a pooling layer (e.g., a max pooling layer) 206, a second one-dimensional convolution layer 208, a pooling layer (e.g., a global max pooling layer) 210, and a dense layer 212. For instance, the distributed device(s) 104 can use the ML model 200 for spatial-based analysis of the network content, such as convolutional analysis of the network content.

In various cases, the distributed device(s) 104 can use the embedding layer 202 for a stage (or "step") of analysis of the network content. The distributed device(s) 104 can use the embedding layer 202 to associate one or more data points, such as one or more bytes of input with one or more other bytes of input. For instance, the embedding layer 202 can translate individual bytes of network content into one dimensional arrays of floating-point numbers which correspond to learned similarities between bytes of network content. Subsequent layers of the ML model (such as one-dimensional convolution layers) can then operate on these embedding arrays.

In various cases, the distributed device(s) 104 can use the first one-dimensional convolution layer 204 for a next stage of analysis of the network content. The distributed device(s) 104 can use the first one-dimensional convolution layer 204, as part of a kind of "repurposed image classification," within the ML model 200, which can analyze the network content as a "one-dimensional image." The distributed device(s) 104 can input the network content into the embedding layer 202, which can turn the network content into one or more embedding vectors. The distributed device(s) 104 can process the embedding vectors by a one-dimensional convolution. The distributed device(s) 104 can use the one-dimensional convolution to build a "view" on each "window" of the network content (e.g., the embedding vector(s)). The distributed device(s) 104 can analyze a portion of the network content at each window. The distributed device(s) 104 can scan the window forward until all of the network content is analyzed.

In various cases, the distributed device(s) 104 can use the max pooling layer 206 as a next stage of analysis of the network content. The distributed device(s) 104 can use the max pooling layer 206, for instance, to take a maximum value within a window of values from the output of the convolutional layer 204. The distributed device(s) 104 can use the max pooling layer 206 to feed that maximum value to the next layer (e.g., the second one-dimensional convolution layer 208).

In various cases, the distributed device(s) 104 can use the second one-dimensional convolution layer 208 for a next stage of analysis of the network content. The distributed device(s) 104 can use the second one-dimensional convolution layer 208, for instance, to perform a convolution on the network content, in a similar way as, or a different way from, the first one-dimensional convolution layer 204. The ML model 200 can perform multiple one-dimensional convolutions of the network content, based on the layer(s) of the ML model including both the first one-dimensional convolution layer 204 and the second one-dimensional convolution layer 208.

In various cases, the distributed device(s) 104 can use the global max pooling layer 210 for a next stage of analysis of the network content. The distributed device(s) 104 can use the global max pooling layer 210, for example, to take a maximum value from all the output values of the second one-dimensional convolution layer 208.

In various cases, the distributed device(s) 104 can use the dense layer 212 for a next stage of analysis of the network content. The dense layer 212, in such an example or another example, can combine the output of each neuron from the global max pooling layer 210 into a single output. In some instances, the distributed device(s) 104 can pass the output of the dense layer 212 through a sigmoid function to turn the output into a probability of the output being associated with an exploit. The distributed device(s) 104 can compare the probability to a threshold probability. For example, the distributed device(s) 104 can flag the probability of the output of the dense layer 212 being greater than a threshold probability as being associated with an exploit. The distributed device(s) 104 can use the output probability of the dense layer 212 to generate an alert if it is found to be greater than a probability threshold.

The distributed device(s) 104 can use the output of the dense layer 212 to generate one or more alerts, such as the alert associated with the network content being flagged. The distributed device(s) 104 can use the alert(s) to treat the network content as unsafe content. The distributed device(s) 104 can drop the unsafe content from the network content and route remaining content (e.g., the filtered HTTP content 116, as discussed above with reference to FIG. 1). The distributed device(s) 104 can analyze the network content in-line, drop the unsafe content prior to it reaching its destination, and route the remaining content to the user device(s) 112.

Figure 3:
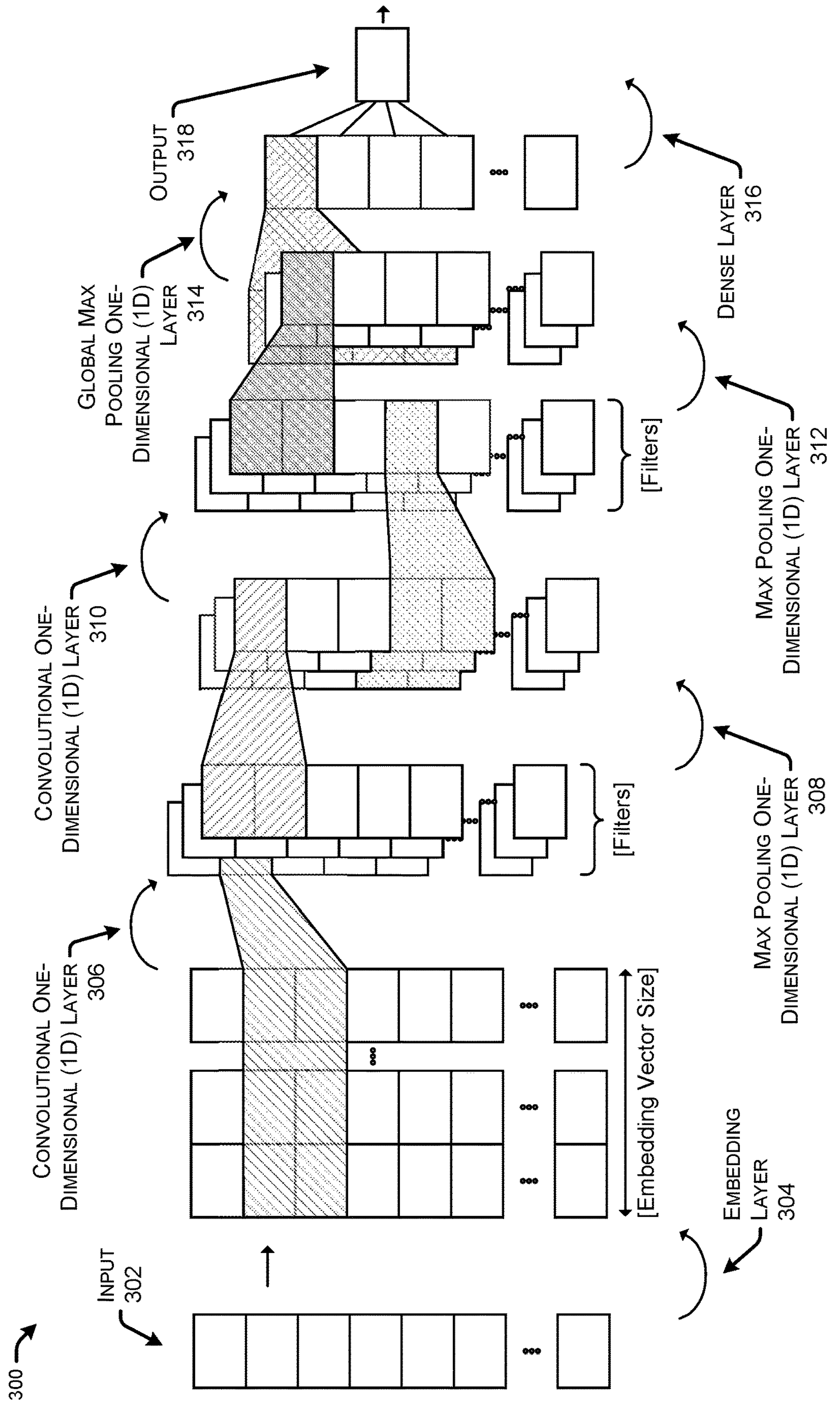
FIG. 3 illustrates an example topology of an in-line neural network-based machine learning (ML) zero-day exploit detection model with three pooling layers.

FIG. 3 illustrates an example topology of a spatial algorithm-based in-line neural network machine learning (ML) zero-day exploit detection model 300. The spatial algorithm-based in-line neural network ML zero-day exploit detection model (also referred to herein simply as "ML model") 300 can include one or more layers. In various examples, the ML model 300 can be utilized to implement any of the ML model(s), as discussed above with reference to FIG. 1, and/or the ML model 200, as discussed above with reference to FIG. 2. The ML model 300 can be managed by one or more devices (e.g., the distributed device(s) 104, as discussed above with reference to FIG. 1). The ML model 300 can process, as input 302, the network content (e.g., the hypertext transfer protocol (HTTP) request query string(s)), as discussed above with reference to FIG. 1.

In some examples, the layer(s) of the ML model 300 can include an embedding layer 304, a convolutional one-dimensional (1D) layer 306, a max pooling 1D layer 308, a convolutional 1D layer 310, a max pooling 1D layer 312, a global max pooling 1D layer 314, and a dense layer 316. The ML model 300 can provide, as output 318, a probability associated with the network content including exploit related content. In those or other examples, the embedding layer 304, the convolutional 1D layer 306, the max pooling 1D layer 308, the convolutional 1D layer 310, the global max pooling 1D layer 314, and/or the dense layer 316 can be used to implement the embedding layer 202, the first one-dimensional convolution layer 204, the max pooling layer 206, the second one-dimensional convolution layer 208, the global max pooling layer 210, and/or the dense layer 212, respectively, as discussed above with reference to FIG. 2. In those or other examples, the max pooling 1D layer 312 and the global max pooling 1D layer 314 can be used to implement the global max pooling layer 210, as discussed above with reference to FIG. 2.

In various cases, the distributed device(s) 104 can use the embedding layer 304 to process the input 302. The embedding layer 304 can turn individual bytes of the network content (e.g., the HTTP request query string(s)) into vectors of floating-point numbers.

The distributed device(s) 104 can slide the one-dimensional convolutional layer 306 over the embedding vectors with one or more feature-extracting filters. These convolution filters can be trained to extract exploit pattern features from the embedding vectors. An exploit pattern feature may include one or more strings of characters such as a number, followed by an equal sign, followed by a number indicating a possible SQL injection attack.

Although the number, followed by an equal sign, followed by a number may be used as an indicator of content being malicious, as discussed above in the current disclosure, it is not limited as such. Any number of endless variations in features may be identified by the ML model and used to identify content as being malicious.

In various cases, the max pooling 1D layer 308 can slide over the output of each convolution filter. For instance, the distributed device(s) 104 can process the output of each of the convolution filter(s) by the max pooling 1D layer 308. Based on the processing of the convolution filter(s), the max pooling 1D layer 308 can take a maximum value over a window of one or more value(s). In some examples, the max pooling 1D layer 308 can compute the maximum value(s) over the window(s) based on the processing of the output of the convolution filter(s), respectively.

In various cases, the convolutional 1D layer 310 can slide over the output of the max pooling 1D layer 308. The convolutional 1D layer 310 can slide across all the filter(s) associated with the output of the convolutional 1D layer 306. For instance, the convolutional 1D layer 310 can perform processing in a different way from the convolutional 1D layer 306, which slides over embedding vector(s) instead of the filter(s) over which the convolutional 1D layer 310 slides.

In various cases, the max pooling 1D layer 312 and the global max pooling 1D layer 314 can take the maximum value of all the output values of individual convolution filters associated with the convolutional 1D layer 310. For instance, the maximum value of all the output values of each of the convolution filters associated with the convolutional 1D layer 310 can be computed. The output of the max pooling 1D layer 312 and the global max pooling 1D layer 314 can include the maximum value(s) of all the output values of each of the convolution filter(s), respectively, associated with the convolutional 1D layer 310. Each of the convolution filter(s) can be used by of the max pooling 1D layer 312 and the global max pooling 1D layer 314 to calculate corresponding maximum value(s).

In various cases, the dense layer 316 can be used to calculate a single probability, which can be output by the ML model. For instance, the output of the ML model can include the output of the dense layer 316. The output of the dense layer 316 can be computed by feeding the maximum value output by the global max pooling 1D layer 314 into the dense layer 316. In some examples, the dense layer 316 can converge the maximum value(s) output by the global max pooling 1D layer 314 into the single probability for output by the dense layer 316 of the ML model. For example, the single probability may correspond to the network content, and/or a portion of the network content, associated with a potential exploit.

In a hypothetical example, an ML model using a neural network architecture can be trained to identify exploits across the Internet based on analysis of HTTP requests. The ML model can be trained using a process called stochastic gradient descent. The training can be performed by monitoring the neural network as the neural network is being trained to optimize the performance and efficacy of the model.

The ML model can use a neural network architecture similar to image processing networks. However, instead of processing a two-dimensional image buffer, as is the case for image processing neural networks, the model can process a one-dimensional buffer of network data. In this way, the neural network can "see" exploit patterns anywhere in the network content.

The ML model, implemented as a network inspector, can be built in such a way that the individual model filters, weights, and biases can be altered based on new training data and then released to customers in a model update. Moreover, the entire neural network architecture can be changed at runtime with a new model file.

Although the ML model 300 can include the embedding layer 304, the convolutional 1D layer 306, the max pooling 1D layer 308, the convolutional 1D layer 310, the max pooling 1D layer 312, the global max pooling 1D layer 314, and/or the dense layer 316, as discussed above in the current disclosure, it is not limited as such. In some examples, the ML model 300 can omit any of the above-discussed layers. In those or other examples, the ML model 300 can include or more other layers of various types that are the same or different as the types of the above-discussed layers. In those or other examples, any of the above-discussed layers can be grouped and/or integrated together with any of the other layers.

Figure 4:
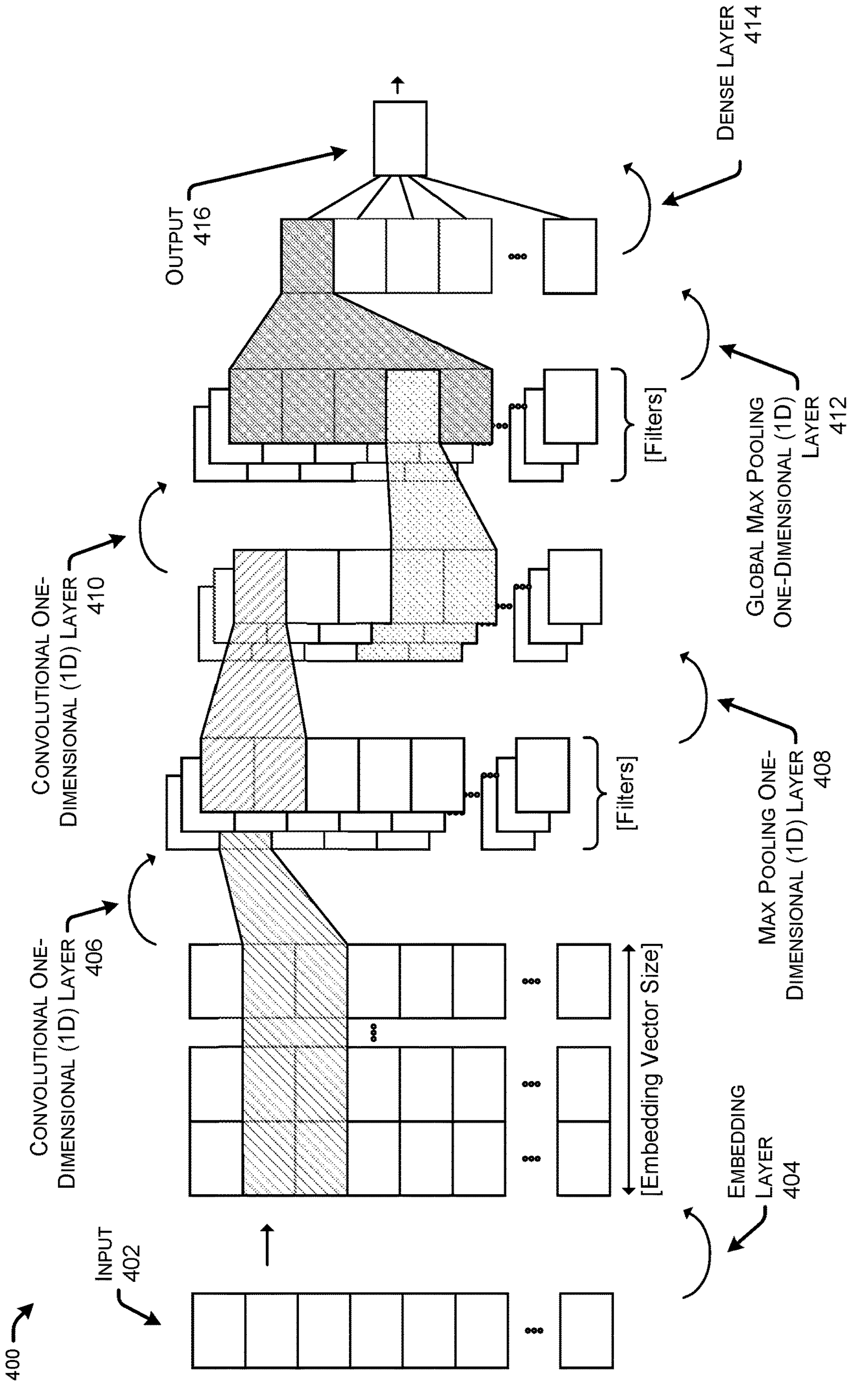
FIG. 4 illustrates an example topology of an in-line neural network-based machine learning (ML) zero-day exploit detection model with two pooling layers.

FIG. 4 illustrates an example topology of an in-line neural network-based machine learning (ML) zero-day exploit detection model 400 with two pooling layers. The spatial algorithm-based in-line neural network ML zero-day exploit detection model (also referred to herein simply as "ML model") 400 can include one or more layers. In various examples, the ML model 400 can be utilized to implement any of the ML model(s), as discussed above with reference to FIG. 1, and/or the ML model 200 as discussed above with reference to FIG. 2. The ML model 400 can be managed by one or more devices (e.g., the distributed device(s) 104, as discussed above with reference to FIG. 1). The ML model 400 can process, as input 402, the network content (e.g., the hypertext transfer protocol (HTTP) request query string(s)), as discussed above with reference to FIG. 1.

In some examples, the layer(s) of the ML model 400 can include an embedding layer 404, a convolutional one-dimensional (1D) layer 406, a max pooling 1D layer 408, a convolutional 1D layer 410, a global max pooling 1D layer 412, and a dense layer 414. The ML model 400 can provide, as output 416, a probability associated with the network content including exploit related content. In those or other examples, the embedding layer 404, the convolutional 1D layer 406, the max pooling 1D layer 408, the convolutional 1D layer 410, the global max pooling 1D layer 412, and/or the dense layer 414 can be used to implement the embedding layer 202, the first one-dimensional convolution layer 204, the max pooling layer 206, the second one-dimensional convolution layer 208, the pooling layer 210, and/or the dense layer 212, respectively, as discussed above with reference to FIG. 2.

In some examples, the embedding layer 404, the convolutional 1D layer 406, the max pooling 1D layer 408, the convolutional 1D layer 410, the global max pooling 1D layer 412, and/or the dense layer 414 can be implemented as the embedding layer 304, the convolutional 1D layer 306, the max pooling 1D layer 308, the convolutional 1D layer 310, the max pooling 1D layer 312, the global max pooling 1D layer 314, and/or the dense layer 316. In those or other examples, instead of converging the maximum value(s) output by a max pooling layer and then a global max pooling layer (e.g., layers 312 and 314), the dense layer 414 can converge the maximum value(s) output by the global max pooling 1D layer 412.

For instance, the output of the ML model can include the output of the dense layer 414. The output of the dense layer 414 can be computed by feeding the maximum value output by the global max pooling 1D layer 412 into the dense layer 414. The dense layer 414 can process the maximum value(s) output by the global max pooling 1D layer 412. In some examples, the dense layer 414 can converge the maximum value(s) output by the global max pooling 1D layer 412 into the single neuron for output by the dense layer 414 of the ML model.

Although the ML model 400 can include the embedding layer 404, the convolutional 1D layer 406, the max pooling 1D layer 408, the convolutional 1D layer 410, the global max pooling 1D layer 412, and/or the dense layer 414, as discussed above in the current disclosure, it is not limited as such. In some examples, the ML model 400 can omit any of the above-discussed layers. In those or other examples, the ML model 400 can include or more other layers of various types that are the same or different as the types of the above-discussed layers. In those or other examples, any of the above-discussed layers can be grouped and/or integrated together with any of the other layers.

Figure 5:
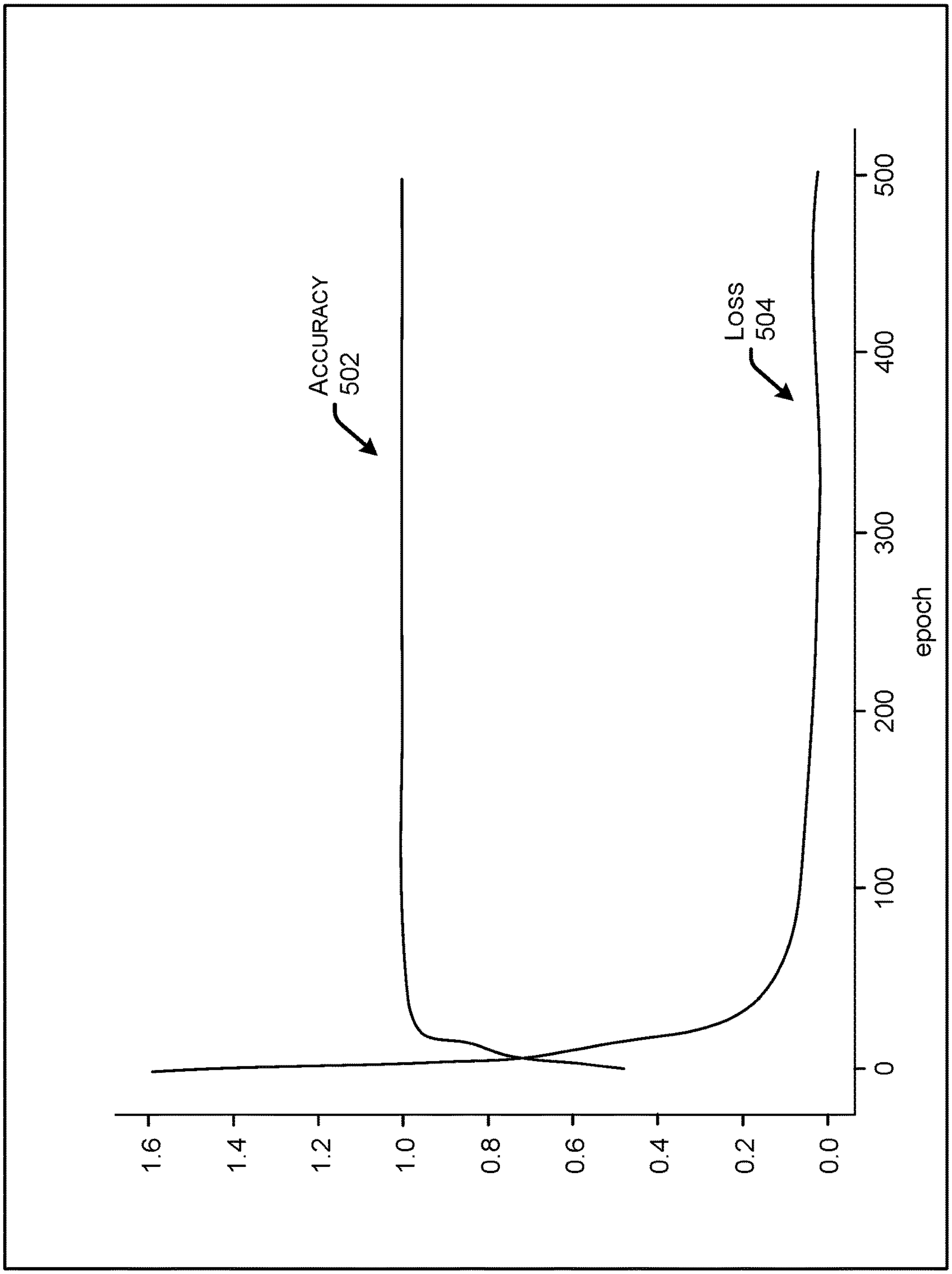
FIG. 5 illustrates an example plot of accuracy and loss vs. epoch during training of an in-line neural network-based machine learning (ML) zero-day exploit detection model.

FIG. 5 illustrates an example diagram 500 of accuracy 502 and loss 504 of a spatial algorithm-based in-line neural network machine learning (ML) zero-day exploit detection model. The diagram 500 includes lines representing the accuracy 502 and loss 504 of the spatial algorithm-based in-line neural network machine learning (ML) zero-day exploit detection model (also referred to herein simply as "ML model") (e.g., any of the ML models as discussed above with reference to FIG. 1, and/or the ML models 200, 300, and/or 400 as discussed above with reference to FIGS. 2-4). The ML model can be managed by one or more devices (e.g., the distributed device(s) 104, as discussed above with reference to FIG. 1).

The diagram 500 is a graph of accuracy 502 and loss 504 vs. epoch during ML model training. As represented in the graph, the accuracy 502 may converge to 1.0 (100%) quickly and the loss 504 may fall exponentially. These measurements may indicate that the neural network architecture is learning to identify exploits and normals correctly. After training, the model is converted to a FlatBuffers file that the network inspector can load through a computer program code library (e.g., C++ ML library) for scanning network content on an ongoing basis.

The network inspector can use the C++ ML library to load, configure, and run ML models in production. The library may provide a simple high-level application programming interface (API) for machine learning operations. The library can read the FlatBuffers file produced by the training process, construct the neural network architecture described by the file, and then build an interpreter capable of performing inference on input with the neural network. The library may contain highly optimized code for performing neural network inference on one or more central processing units (CPU(s)) and/or one or more tensor processing units (TPU(s)).

In some examples, the C++ ML library can load the FlatBuffers packed neural network model with a build method that verifies the dimensions of the input and output tensors. Then, the ML library can instantiate a classifier capable of running the neural network on an input string. The distributed device(s) 104 can pass the input string to a run method which can execute the neural network. The distributed device(s) 104 can receive the output result(s) of the neural network based on the output result(s) returned from the run method. The distributed device(s) 104 can use the output result(s) to block exploits.

The library can include a binary classifier which includes a neural network model and a model interpreter stored as thread specific data. The neural network model may be shared and/or copied between one or more classifiers, such as the binary classifier in the library.

The network inspector which runs the ML model on network content can have one or more configuration options. These configuration options may include ML model filename(s), Boolean switches for controlling which application layer fields are scanned, and threshold value(s) which specify the decision point used by the inspector to determine if the output of the ML model indicates that the input was malicious. Threshold values can be floating-point numbers (e.g., 0.85, 0.90, 0.95 etc.). The distributed device(s) 104 can compare the output of the ML model with the threshold value, such as 0.95, to determine if the network content is potentially malicious and should be blocked. However, while 0.95 may be used for optimizing results of comparisons, the distributed device(s) 104 can use any other of the threshold values for the comparison.

A plot of accuracy and loss such as the one in the diagram 500 may be used to determine if successive iterations of the neural network architecture are learning to identify exploits and normals correctly. This plot may be used to adjust model hyperparameters such as batch size, training epochs, and convolution window size to improve performance with each iteration of the ML model.

Although the C++ ML library can be utilized for performing various functions as discussed above in the current disclosure, it is not limited as such. In various examples, one or more computer program code libraries of various types can be utilized for any of the network functions performed utilizing the C++ ML library. For instance, the computer program code library(ies) can be utilized to scan network content, to load, configure, and/or run ML models, to load one or more cross platform serialization libraries, and/or to perform various other operations for purposes of implementing any of the techniques discussed herein.

Figure 6:
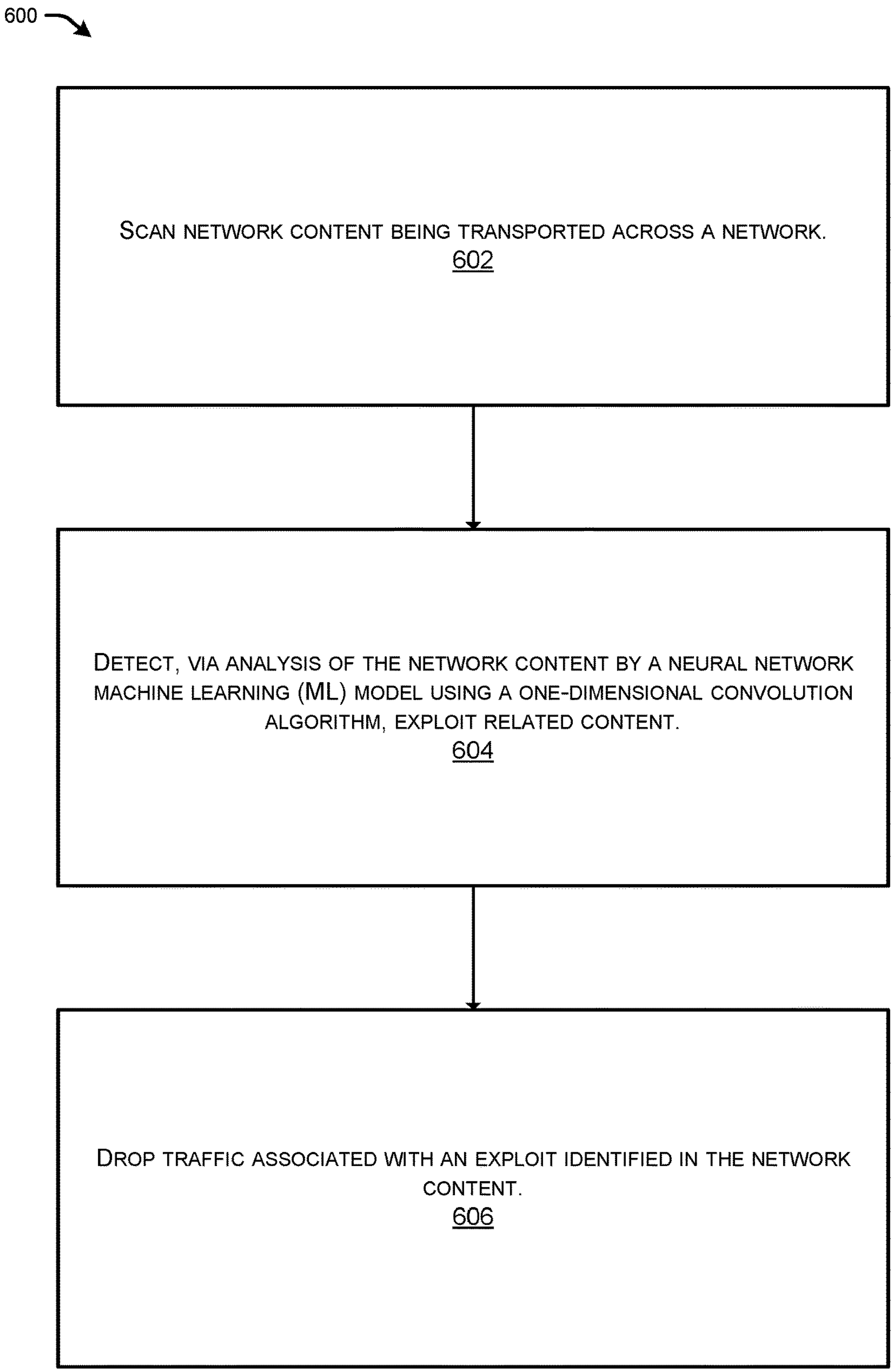
FIG. 6 illustrates a flow diagram of an example method that illustrates aspects of the functions performed at least partly by the devices in the in-line neural network based zero-day exploit detection management distributed architecture as described in FIG. 1.

FIG. 6 illustrates a flow diagram 600 of an example method that illustrates aspects of the functions performed at least partly by the devices in the in-line neural network based zero-day exploit detection management distributed architecture 102 as described in FIG. 1. The in-line neural network based zero-day exploit detection management distributed architecture 102 includes the distributed device(s) 104, for example.

At 602, the distributed device(s) 104 can scan network content transported across a network. The network content can be scanned to detect, at line-rate, never-before-seen exploits based on the output of the ML model.

At 604, the distributed device(s) 104 can detect exploit content, via analysis of the network content by a neural network machine learning (ML) model utilizing a one-dimensional convolution algorithm. The ML model can include an embedding layer, a first one-dimensional convolution layer, a max pooling layer, a second one-dimensional convolution layer, a global max pooling layer, and finally a dense layer. The ML model can be compiled down to optimized machine code and used to perform character-level analysis of the network content to detect exploits.

At 606, the distributed device(s) 104 can drop traffic associated with an exploit prior to it reaching its destination. For instance, the distributed device(s) 104 can block the exploit at line-rate.

Figure 7:
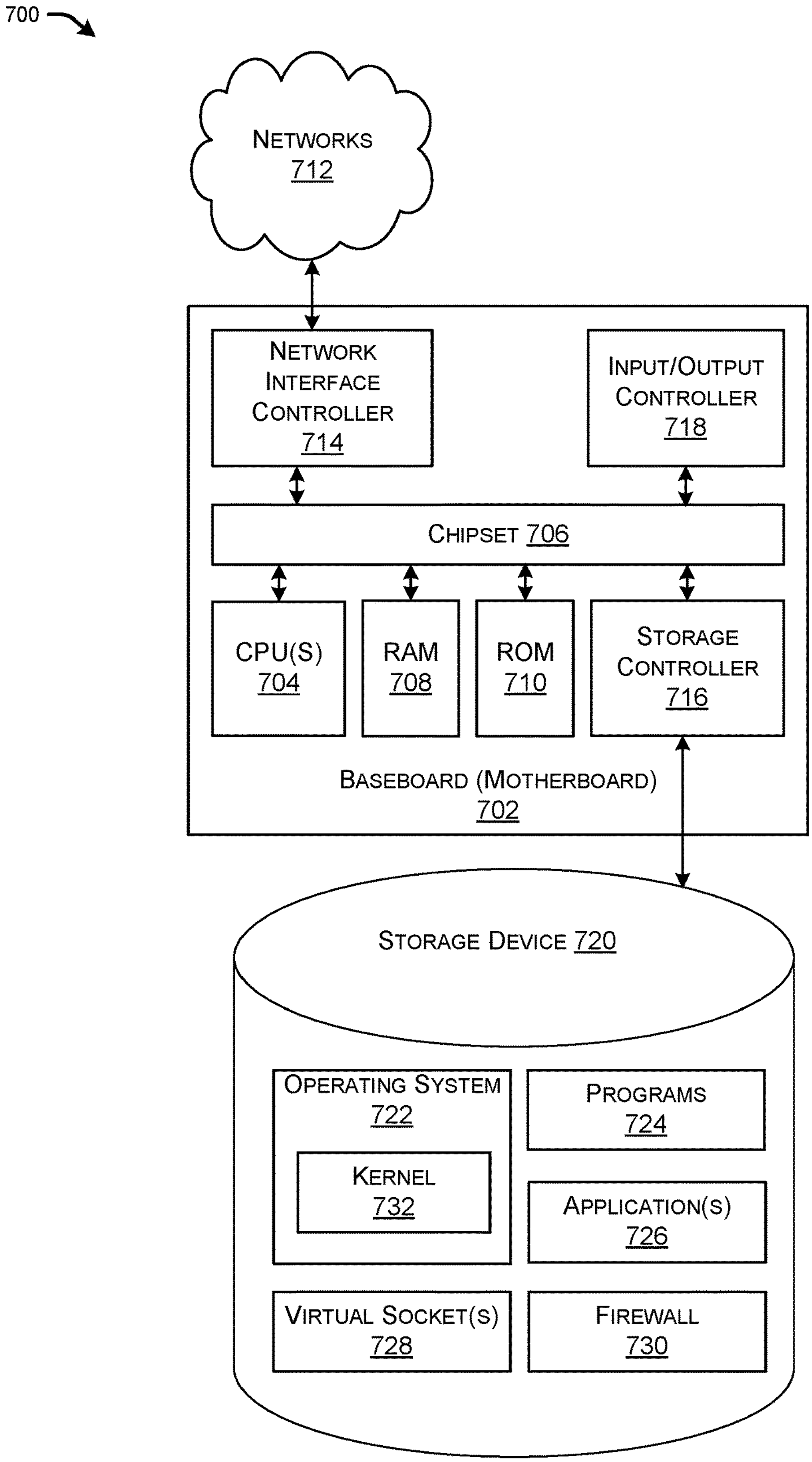
FIG. 7 shows an example computer architecture for a computing device (or network routing device) capable of executing program components for implementing the functionality described above.

FIG. 7 shows an example computer architecture 700 for a server computer capable of executing program components for implementing the functionality described above. For example, the computer hardware architecture 700 can be used to implement one or more computing devices (e.g., the distributed device(s) 104, as discussed above with reference to FIG. 1).

The computer architecture 700 shown in FIG. 7 illustrates a conventional server computer, workstation, desktop computer, laptop, tablet, network appliance, smartphone, or other computing device, and can be utilized to execute any of the software components presented herein. The computer architecture 700, for example, can be utilized to implement a distributed application system hosting an application service to perform various functions discussed herein. The computer hardware architecture 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a random-access memory (RAM) 708, used as the main memory in the computer 700. The chipset 706 can further provide an interface to a computer-readable storage medium such as a read-only memory (ROM) 710 or non-volatile RAM (NVRAM) for storing basic routines that help to start the computer 700 and to transfer information between the various components and devices. The ROM 710 or NVRAM can also store other software components necessary for the operation of the computer 700 in accordance with the configurations described herein.

The computer 700 can also include one or more networks 712, a network interface controller (NIC) 714, a storage controller 716, and one or more input/output controllers 718. The computer 700 can operate in a networked environment using logical connections to remote computing devices and computer systems through one or more networks, such as the network(s) 712. The chipset 706 can include functionality for providing network connectivity through the network interface controller (NIC) 714, such as a gigabit Ethernet adapter. The NIC 714 is capable of connecting the computer 700 to other computing devices over the network(s) 712. Multiple NICs 714 can be present in the computer 700, connecting the computer 700 to other types of networks and remote computer systems. In some instances, the NICs 714 may include an ingress port and an egress port.

The computer 700 can be connected to a storage device 720 that provides non-volatile storage for the computer. The storage device 720 can store an operating system 722, programs 724, and data, which have been described in greater detail herein. The storage device 720 can be connected to the computer 700 through the storage controller 714 connected to the chipset 706. The storage device 720 can consist of one or more physical storage units. The storage controller 714 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 700 can store data on the storage device 720 by transforming the physical state of the physical storage units to reflect the information being stored. The specific transformation of physical state can depend on various factors, in different embodiments of this description. Examples of such factors can include the technology used to implement the physical storage units, whether the storage device 720 is characterized as primary or secondary storage, and the like.

For example, the computer 700 can store information to the storage device 720 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 720 by detecting the physical states or characteristics of one or more locations within the physical storage units.

In addition to the mass storage device 720 described above, the computer 700 can have access to other computer-readable storage media to store and retrieve information, such as program modules, data structures, or other data. In some examples, the operations performed by any network node described herein may be supported by one or more devices similar to computer 700. Stated otherwise, some of or all the operations performed by a network node may be performed by one or more computers (or "computer devices") 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 720 can store an operating system 722 used to control the operation of the computer 700. According to one embodiment, the operating system comprises the LINUX (TM) operating system. According to another embodiment, the operating system includes the WINDOWS (TM) SERVER operating system from MICROSOFT Corporation of Redmond, Washington. According to further embodiments, the operating system can comprise the UNIX (TM) operating system or one of its variants. It should be appreciated that other operating systems can also be used. The storage device 720 can store other operating systems or application programs and data used by the computer 700.

In one embodiment, the storage device 720 or other computer-readable storage media is encoded with computer-executable instructions which can be loaded into the computer 700. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above regarding FIGS. 1-6. The computer 700 can also include computer-readable storage media having instructions stored thereupon for performing any of the other computer-implemented operations described herein.

As illustrated in FIG. 7, the storage device 720 stores an operating system 722, one or more programs 724, which may include one or more processes, as well as one or more applications 726, one or more virtual sockets 728, and a firewall 730 described above. The operating system 722 may include a kernel 732 described above. The operating system 722, the programs 724, one or more applications 726, one or more virtual sockets 728, and a firewall 730 may include instructions that, when executed by the CPU(s) 704, cause the computer 700 and/or the CPU(s) 704 to perform one or more operations.

The computer 700 can also include one or more input/output controllers 718 for receiving and processing input from different input devices, such as a keyboard, a mouse, a touchpad, a touch screen, or other types of input devices. Similarly, an input/output controller 718 can provide output to a display, such as a computer monitor, a flat-panel display, or other type of output device. The computer 700 might not include all the components shown in FIG. 7, can include other components that are not explicitly shown in FIG. 7, or might use an architecture completely different than that shown in FIG. 7.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, the claims are not necessarily limited to the specific features or acts described. Rather, the specific features and acts are merely illustrative of some embodiments that fall within the scope of the claims of the application.

What is claimed is:

1. A method, comprising:

scanning network content transported across a network;

just-in-time compiling a machine learning (ML) model to optimized machine code;

analyzing, at least at a line-rate of the network content, the network content using the ML model that was just-in-time compiled;

detecting exploit related content via analysis of the network content by the ML model using a one-dimensional convolution algorithm, wherein detecting the exploit related content further comprises:

analyzing the network content by an embedding layer of the ML model;

analyzing the network content by a first one-dimensional convolution layer of the ML model;

analyzing the network content by a max pooling layer of the ML model;

analyzing the network content by a second one-dimensional convolution layer of the ML model;

analyzing the network content by a global pooling layer of the ML model; and analyzing the network content by a dense layer of the ML model, the dense layer outputting a prediction value associated with a likelihood of an application layer protocol session of the network content being associated with an exploit, wherein the exploit related content is associated with the exploit; and dropping traffic associated with the exploit by performing in-line blocking at the line-rate of the network content associated with the exploit identified in the network content, wherein the in-line blocking prevents the exploit from reaching a targeted system.

2. The method of claim 1, wherein the exploit is a zero-day attack.

3. The method of claim 1, wherein the exploit includes a never-before-seen attack, and dropping the traffic further comprises preventing the never-before-seen attack from reaching the targeted system.

4. The method of claim 1, wherein detecting the exploit related content further comprises generating a prediction value associated with a likelihood of a hypertext transfer protocol (HTTP) session being associated with the exploit.

5. The method of claim 1, further comprising:
just-in-time compiling ML model instructions associated with the ML model down to machine code;
executing the machine code at run time; and
based on a result of the ML model, performing a block at line-rate of exploits that include a SQL injection attack, a command injection attack, or a code injection attack.

6. A network device comprising:
one or more processors; and
one or more non-transitory computer-readable media storing computer-executable instructions that, when executed by the one or more processors, cause the one or more processors to perform operations comprising:
scanning network content transported across a network;
detecting, via analysis of the network content by a neural network machine learning (ML) model using a one-dimensional convolution algorithm, exploit related content,
wherein detecting the exploit related content further comprises:
analyzing the network content by an embedding layer of the ML model;
analyzing the network content by a first one-dimensional convolution layer of the ML model;
analyzing the network content by a max pooling layer of the ML model;
analyzing the network content by a second one-dimensional convolution layer of the ML model;
analyzing the network content by a global max pooling layer of the ML model; and
analyzing the network content by a dense layer of the ML model, the dense layer outputting a prediction value associated with a likelihood of an application layer protocol session of the network content being associated with an exploit, wherein the exploit related content is associated with the exploit; and
dropping traffic associated with the exploit identified in the network content.

7. The network device of claim 6, wherein dropping the traffic further comprises performing in-line blocking at line-rate of an attack.

8. The network device of claim 6, wherein the exploit is a zero-day attack.

9. The network device of claim 6, wherein the exploit includes a never-before-seen attack, and dropping the traffic further comprises preventing the never-before-seen attack from reaching a targeted system.

10. The network device of claim 6, wherein detecting the exploit related content further comprises generating a prediction value associated with a likelihood of a hypertext transfer protocol (HTTP) session being associated with the exploit.

11. The network device of claim 6, further comprising:
just-in-time compiling ML model instructions associated with the ML model down to machine code;
executing the machine code at run time; and
based on a result of the ML model, performing a block at line-rate of exploits.

12. A distributed computing system hosting an application service, the distributed application system comprising:
one or more processors; and
one or more non-transitory computer-readable media storing computer-executable instructions that, when executed by the one or more processors, cause the one or more processors to perform operations comprising:
scanning network content transported across a network;
detecting exploit related content via analysis of the network content by a neural network machine learning (ML) model using a one-dimensional convolution algorithm,
wherein detecting the exploit related content further comprises:
analyzing the network content by an embedding layer of the ML model;
analyzing the network content by a first one-dimensional convolution layer of the ML model;
analyzing the network content by a max pooling layer of the ML model;
analyzing the network content by a second one-dimensional convolution layer of the ML model;
analyzing the network content by a global max pooling layer of the ML model; and
analyzing the network content by a dense layer of the ML model, the dense layer outputting a prediction value associated with a likelihood of an application layer protocol session of the network content being associated with an exploit, wherein the exploit related content is associated with the exploit; and
dropping traffic associated with the exploit identified in the network content.

13. The distributed computing system of claim 12, wherein dropping the traffic further comprises performing in-line blocking of an attack at line-rate.

14. The distributed application system of claim 12, wherein the exploit is a zero-day attack.

15. The distributed computing system of claim 12, wherein the exploit includes a never-before-seen attack, and dropping the traffic further comprises preventing the never-before-seen attack from reaching a targeted system.

16. The distributed computing system of claim 12, wherein detecting the exploit related content further comprises generating a prediction value associated with a likelihood of a hypertext transfer protocol (HTTP) session being associated with the exploit.

* * * * *